(12) United States Patent
Barsotti et al.

(10) Patent No.: US 7,148,310 B2
(45) Date of Patent: Dec. 12, 2006

(54) MULTIPLE COMPONENT COATING COMPOSITION UTILIZING DILUTION STABLE POLYISOCYANATES

(75) Inventors: Robert John Barsotti, Franklinville, NJ (US); Christopher Scopazzi, Wilmington, DE (US); Douglas Matt Lamb, Landsale, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 53 days.

(21) Appl. No.: 10/917,765

(22) Filed: Aug. 13, 2004

(65) Prior Publication Data

US 2005/0085614 A1     Apr. 21, 2005

Related U.S. Application Data

(60) Provisional application No. 60/511,444, filed on Oct. 15, 2003.

(51) Int. Cl.
*C08G 18/67* (2006.01)
(52) U.S. Cl. ............... 528/75; 528/59; 528/69; 528/73; 525/123; 525/127
(58) Field of Classification Search ........ 525/123, 525/127; 528/59, 69, 73, 75
See application file for complete search history.

(56) References Cited

U.S. PATENT DOCUMENTS

| 3,585,160 A | | 6/1971 | Miller et al. |
| 4,754,011 A | * | 6/1988 | Dexter et al. ............ 526/310 |
| 5,260,101 A | * | 11/1993 | Larson et al. ............ 427/388.2 |
| 5,466,745 A | | 11/1995 | Fiori et al. |
| 5,609,916 A | | 3/1997 | Fiori et al. |
| 5,859,136 A | | 1/1999 | Scopazzi et al. |
| 6,005,045 A | | 12/1999 | Klanica |
| 6,221,494 B1 | | 4/2001 | Barsotti et al. |
| 6,313,218 B1 | | 11/2001 | Fiori et al. |
| 6,316,543 B1 | | 11/2001 | Fiori |
| 6,528,606 B1 | | 3/2003 | Bear et al. |

FOREIGN PATENT DOCUMENTS

JP         03026771     *  2/1991

OTHER PUBLICATIONS

Saunders et al; Polyurethanes; Part II; 1964; p. 492.*
Mohammed et al; Bulk copolymerization of dimethyl meta-isopropenyl benzyl isocyanate; Journal of Applied Polymer Science (1998), 67(3); STN abstract.*

* cited by examiner

*Primary Examiner*—Rachel Gorr
(74) *Attorney, Agent, or Firm*—Sudhir G. Deshmukh

(57) ABSTRACT

The present invention is directed to a multiple component coating composition comprising (a) a film forming binder component having isocyanate reactive groups; (b) a stable polyisocyanate solution comprising organic liquid and up to 30% by weight, based on the weight of the polyisocyanate solution, of a polyisocyanate having reactive isocyanate groups selected from an aromatic polyisocyanate having tertiary isocyanate groups or a (meth)acrylic polymer containing reactive isocyanate groups; and (c) optionally, a tinting composition comprising pigment, a dispersing agent and an organic liquid carrier; whereby components (a), (b) and (c) are blended together before application to a substrate and after application to a substrate the composition is cured to form a finish. The present invention is also directed to a method of producing a finish on a substrate and to the resulting coated substrate.

16 Claims, No Drawings

# MULTIPLE COMPONENT COATING COMPOSITION UTILIZING DILUTION STABLE POLYISOCYANATES

CROSS REFERENCE TO RELATED APPLICATIONS

This application claims priority under 35 U.S.C. §119 from U.S. Provisional Application Ser. No. 60/511,444, filed Oct. 15, 2003 and which is incorporated by reference herein as if fully set forth.

BACKGROUND OF THE INVENTION

1. Field of the Invention

This invention is directed to a coating composition, in particular, to a multiple component coating composition particularly useful for automotive refinish applications.

2. Description of the Prior Art

In the refinishing of automobiles or trucks, after they have been damaged or in the repainting of automobiles and trucks or parts thereof, the refinish paint or coating composition that is used is required to cure at ambient temperatures or slightly elevated curing temperature of, for example, 40 to 80° C. Higher baking temperatures that are used in OEM (original equipment manufacture) can not be used since the interior and the many plastic parts used in automobiles and trucks would be damaged. Typical refinish coating compositions utilize multiple components. For example, a typical base coat for a conventional base coat/clear coat finish or a colored mono coat utilize a tint containing pigments, a binder containing film forming constituents, a reducer which is a solvent mixture to reduce the viscosity of the composition to a spray viscosity and a crosslinking component which typically is a polyisocyanate. A typical clear coat used for refinishing or repainting contains all of the above components except for the tint.

It would be desirable to simplify the formulation of these compositions, for example, by reducing the number of components used in the formulation thereof. Such an attempt has been made by blending the crosslinking component, a polyisocyanate, with the reducer. But typical polyisocyanate crosslinking agents that are conventionally used in these refinish coating compositions, such as, hexamethylene diisocyanate, trimers of hexamethylene diisocyanate, isophorone diisocyanate and the like when mixed with typical reducing solvents at low levels of polyisocyanate concentration of 30 percent and less are not stable and typically have a shelf life of less than one week under ambient temperature conditions.

It would be desirable to develop a multiple component coating composition that utilizes a stable polyisocyanate solution that has a low concentration of polyisocyanate that can be used to formulate primer compositions, base coating compositions, pigmented mono-coat compositions, and clear coat compositions that are useful for refinishing and repainting automobile bodies, truck bodies and parts thereof.

SUMMARY OF THE INVENTION

The present invention is directed to a multiple component coating composition comprising
(a) a film forming binder component having at least two isocyanate reactive groups;
(b) a stable polyisocyanate solution comprising organic liquid and up to 30% by weight, based on the weight of the polyisocyanate solution, of a polyisocyanate having reactive isocyanate groups selected from an aromatic polyisocyanate having tertiary isocyanate groups or a (meth)acrylic polymer containing reactive isocyanate groups;
(c) optionally, a tinting composition comprising pigment, a dispersing agent and an organic liquid carrier;
whereby components (a), (b) and (c) are blended together before application to a substrate and after application to a substrate the composition is cured to form a finish.

The present invention also is directed to a method of producing a finish on a substrate and to the resulting coated substrate and to assembled components or assembled automobiles or assembled trucks.

DETAILED DESCRIPTION OF THE INVENTION

A particular advantage of the coating composition of this invention is that a stable polyisocyanate solution that has a low concentration of polyisocyanate is used to formulate primer coating compositions, base coating compositions, pigmented mono-coat compositions, and clear coat compositions that are useful for refinishing and repainting of automobile bodies, truck bodies and parts thereof. These stable polyisocyanate solutions have a long shelf life and can be stored as separate components of the coating composition for up to several years without deterioration of the polyisocyanate.

The following terms used herein and are defined as follows:

"Multiple component coating composition" means a thermosetting coating composition comprising at least two components stored in separate containers. In this invention, the components are the binder, for example, an acrylic polymer having reactive hydroxyl groups, optionally, a tinting composition containing pigments and a crosslinking component, typically a solution of a polyisocyanate or a solution of an acrylic polymer having reactive isocyanate groups. Other additives also may be used and are stored in separate containers. These containers are sealed to increase the shelf life of the components of the coating composition. The components are mixed prior to use and applied as a layer, typically by spraying, to the desired thickness on a substrate surface, such as, an auto or truck body. After application, the layer is cured under ambient conditions or cured at slightly elevated temperatures (up to 80° C.) to form a finish on the substrate having desired properties, such as, hardness, chip resistance, and humidity resistance.

"Number average molecular weight" and "weight average molecular weight also referred to herein as "GPC weight average molecular weight" and "GPC number average molecular weight" means a weight average molecular weight (Mw) and a number average molecular weight (Mn), respectively measured by utilizing gel permeation chromatography. A high performance liquid chromatograph (HPLC) supplied by Hewlett-Packard; Palo Alto, Calif. was used. Unless stated otherwise, tetrahydrofuran was used as the liquid phase and polystyrene was used as the standard.

"Polydispersity" of a polymer is a ratio of Mw to Mn.

"(Meth)acrylate" means methacrylate and acrylate.

"Polymer solids", "composition solids" or "binder solids" means a polymer, composition or binder in its dry state.

"Binder" is the organic film forming component of the coating composition.

"Low VOC coating composition" means a coating composition that includes the range of from 0.1 kilograms (1.0 pounds per gallon) to 0.72 kilograms (6.0 pounds per gallon), preferably 0.3 kilograms (2.6 pounds per gallon) to 0.6 kilograms (5.0 pounds per gallon) and more preferably 0.24 kilograms (2.0 pounds per gallon) to 0.48 kilograms (4.0 pounds per gallon) of the solvent per liter of the coating composition. All VOC's determined under the procedure provided in ASTM D3960.

"High solids composition" means a coating composition having solid component of above 30 percent, preferably in the range of from 35 to 90 percent and more preferably in the range of from 40 to 80 percent, all in weight percentages based on the total weight of the composition.

"Tg" (glass transition temperature) measured in ° C. determined by DSC (Differential Scanning Calorimetry).

"Stable Polyisocyanate Solution" means a solution that does not gel, does not have a loss of more than 25% of the reactive isocyanate groups and does not have any visual haze or cloud and does not have a Turbidity value of more than 20, preferably, not more than 10, when held for 3 months at room temperature or for 4 weeks at 49° C.

The multiple component coating composition of the present invention includes a binder component, typically, an acrylic polymer, another polymer or oligomer each having isocyanate reactive groups and a crosslinking component of an aromatic polyisocyanate having tertiary isocyanate groups or a (meth)acrylic polymer containing isocyanate groups. These components are stored separately, for example, in separate containers and are mixed just prior to use. The coating composition generally includes in the range of 40 weight percent to 95 weight percent of the binder component and 5 weight percent to 60 weight percent of the crosslinking component, all percentages being based on film forming binder solids. Preferably, the coating composition contains 50 weight percent to 90 weight percent of the binder component and 10 weight percent to 50 weight percent of the crosslinking component and more preferably, the coating composition contains 65 weight percent to 85 weight percent of the binder and 15 weight percent to 35 weight percent of the crosslinking component, all percentages being based on the film forming composition solids.

The binder component can be an acrylic polymer, a polyester, an alkyd resin, acrylic alkyd resin, a cellulose acetate butyrate, an iminated acrylic polymer, an ethylene/vinyl acetate polymer, nitrocellulose, a plasticizer, a polyesterurethane, a polyurea, oligomers of such polymers or mixtures of the above. The binder component can include in the range of 20 weight percent to 90 weight percent, preferably in the range of 30 weight percent to 80 weight percent, and more preferably in the range of 40 weight percent to 70 weight percent of an acrylic polymer, with the complementary percentages being a polyester, polyesterurethane, cellulose acetate butyrate, an iminated acrylic polymer, an ethylene vinyl acetate polymer, a polyurea, nitrocellulose, plasticizer, oligomers of such polymers or mixtures thereof, all percentages being based on the binder component solids.

Typically useful acrylic polymers include other monomers that are used to provide desired properties, such as, a Tg of −20° C. and above. Typically useful monomers and mixtures thereof include styrene, alkyl styrene; vinyl toluene; acrylonitrile; glycidyl(meth)acrylate, alkyl(meth)acrylates having 1–18 carbon atoms in the alkyl group, such as methyl(meth)acrylate, ethyl(meth)acrylate, propyl(meth) acrylate, isopropyl(meth)acrylate, butyl(meth)acrylate, pentyl(meth)acrylate, hexyl(meth)acrylate, 2-ethylhexyl(meth) acrylate, nonyl(meth)acrylate, lauryl(meth)acrylate, stearyl (meth)acrylate; cycloalkyl(meth)acrylates having 3–18 carbon atoms in the cycloalkyl group, such as cyclohexyl (meth)acrylate, trimethylcyclohexyl(meth)acrylate, isobutylcyclohexyl(meth)acrylate; isobornyl(meth)acrylate, aryl (meth)acrylates, such as, benzyl(meth)acrylate; substituted benzyl(meth)acrylate, or any combinations thereof. Methacrylates of methyl, butyl, n-butyl, and isobornyl are preferred. Hydroxy alkyl(meth)acrylates having 2–4 carbon atoms in the alkyl group, such as, hydroxy-ethyl(meth) acrylate, 1-hydroxy-propyl(meth)acrylate, 2-hydroxy-propyl(meth)acrylate, hydroxy-butyl(meth)acrylate, hydroxy-isobutyl(meth)acrylate are generally used to provide isocyanate reactive groups.

Also, the acrylic polymer can contain pendent oxazoline ester groups and aminoester groups. Such groups are provided by monomers, such as, vinyl oxazoline esters of drying oil fatty acids such as linseed oil fatty acids and alkyl(meth)acrylate aminoesters having 1–12 carbon atoms in the alkyl group, such as, dimethyl-amino-ethyl methacrylate, diethyl-amino-ethyl methacrylate, tertiary-butyl-amino-ethyl methacrylate. U.S. Pat. No. 3,585,160 discloses these polymers and compositions containing such polymers and is hereby incorporated by reference.

Acrylic polymers suitable for use may be a linear polymer, a branched polymer, a core-shell polymer, or a combination thereof. The linear acrylic polymer is preferred. The acrylic polymer preferably has a molecular weight and a Tg in a certain range. The acrylic polymer which may be a linear or branched acrylic polymer has a weight average molecular weight (Mw) varying in the range of from 3,000 to 60,000, preferably, varying in the range of from 3,000 to 30,000, more preferably, varying in the range of from 3,000 to 20,000 and a Tg varying in the range of from −20° C. to 100° C., preferably varying in the range of from 0° C. to 90° C., and more preferably varying in the range of from 20° C. to 80° C.

Linear acrylic polymers may be produced by conventional processes well known in the art. Typically, solvent is added to a reactor and brought to reflux at elevated temperatures under an inert gas blanket, typically, nitrogen gas. Optionally, before adding heat, the reactor may be fed with a portion of the monomer mixture and one or more typical initiator, such as, the azo type catalysts, which include 2,2'-azobis (2,4 dimethylpentane nitrile); peroxides, such as di-tertiarybutyl peroxide; and hydroperoxides. Commercially available peroxy type initiator t-butylperoxide, available under the trade name Luperox® D1 110–054 from Elf Atochem North America, 2000 Market Street, Philadelphia, Pa., is suitable for use in the present invention. Upon attaining the desired polymerization temperature, the initiator and the monomer mixture are simultaneously fed to the reactor over a period of time. Optionally, a shot of hydroxy containing monomer may be added towards the end of polymerization. Sometimes, it is also desirable to add additional initiator upon completion of addition of the monomer mixture to ensure completion of the polymerization process.

The aforedescribed acrylic resin may be conventionally prepared in accordance with the process disclosed in the U.S. Pat. No. 5,286,782, which is incorporated herein by reference.

A branched acrylic polymer can be produced by a polymerization process, described in U.S. Pat. Nos. 4,680,352 and 5,290,633, which are incorporated herein by reference. Typically, the branched polymers are made in two stages. In the first stage, macromonomers, using conventional cobalt (II) or (III) chelate chain transfer agent, are produced to ensure that the macromonomer is provided with one terminal ethylenically unsaturated group, which is polymerizable. During the second stage, the monomer mixture described earlier is added to the reactor containing the macromonomers. The monomers polymerize with the ethylenically unsaturated group on the macromonomer to produce the branched acrylic polymer.

The core-shell polymer has a solvent insoluble core, and a solvent soluble shell, chemically attached to the core. Preferably, the shell is in the form of macromonomer chains or arms attached to it. The core-shell polymer is a polymer particle dispersed in an organic media, wherein the polymer particle is stabilized by what is known as steric stabilization. The average particle size of the core ranges from 0.1 to 1.0 microns, preferably from 0.15 to 0.6, more preferably from 0.15 to 0.6.

The core-shell polymer includes in the range of from about 10 percent to 90 percent, preferably, in the range of from 50 percent to 80 percent all in weight percent based on the weight of the dispersed polymer, of a core formed from high molecular weight polymer having a weight average molecular weight of about 50,000 to 500,000, preferably, in the range of from 50,000 to 200,000, more preferably, in the range of from 50,000 to 150,000. The arms make up about 10 percent to 90 percent, preferably, 20 percent to 50 percent, all in weight percent based on the weight of the core-shell polymer. The arms are formed from a low molecular weight polymer having weight average molecular weight in the range of from about 1,000 to 50,000, preferably, in the range of from 2,000 to 40,000, more preferably, in the range of from 3,000 to 30,000.

The core of the dispersed core-shell polymer is comprised of one or more polymerized acrylic monomers. Suitable monomers include the aforementioned hydroxy alkyl(meth)acrylate containing monomers, styrene, alkyl(meth)acrylate having alkyl carbon atoms in the range of from 1 to 18, preferably in the range of from 1 to 12; cycloalkyl(meth)acrylate having cycloalkyl carbon atoms in the range of from 3 to 18, preferably, in the range of from 3 to 12; ethylenically unsaturated mono-carboxylic acids, such as, (meth)acrylic acid, silane-containing monomers, and epoxy containing monomers, such as, glycidyl(meth)acrylate. Other optional monomers include amine containing monomers, or (meth)acrylonitrile. Optionally, the core may be crosslinked through the use of diacrylates or dimethacrylates, such as, allyl methacrylate or through post reaction of hydroxyl moieties with polyfunctional isocyanates or carboxylic moieties with epoxy moieties.

The macromonomer arms attached to the core are polymerized from the hydroxyl alkyl(meth)acrylate monomers, described above. In addition, the arms may be polymerized from monomers, such as, styrene, alkyl(meth)acrylates having 1 to 12 carbon atoms and cycloalkyl(meth)acrylates having from 3 to 12 carbon atoms.

The process for making the core-shell polymer is described in U.S. Pat. No. 5,859,136, which is incorporated herein by reference.

Suitable iminated acrylic polymers can be formed by reacting the aforementioned acrylic polymers containing carboxyl groups with an alkylene imine, preferably, propylene imine.

Suitable cellulose acetate butyrates have a butyrate content, for example, 38 to 51% by weight, and a viscosity of 1 to 20 seconds and are supplied by Eastman Chemical Co., Kingsport, Tenn. under the trade names CAB-381-20, CAB 531-1 and CAB 381-2.

Suitable nitrocellulose resins preferably have a viscosity of about 0.5–6 seconds. Preferably, a blend of nitrocellulose resins is used.

Suitable ethylene-vinyl acetate polymers supplied by Honeywell Specialty Materials-Wax and Additives, Morristown, N.J., under the trade name A-C® 405 (T) Ethylene—Vinyl Acetate Copolymer.

Suitable plasticizers include butyl benzyl phthalate, dibutyl phthalate, triphenyl phosphate, 2-ethylhexyl benzyl phthalate, dicyclohexyl phthalate, diallyl toluene phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, and di(methyl cyclohexyl) phthalate. One preferred plasticizer is butyl benzyl phthalate.

Suitable alkyd resins are the esterification products of drying oil fatty acids, such as, linseed oil, tall oil and dehydrated castor oil fatty acids and a polyhydric alcohol, a dicarboxylic acid and an aromatic mono-carboxylic acid. Typically useful polyhydric alcohols are glycerine, pentaerythritol, trimethylol ethane, trimethylol propane; glycols, such as ethylene glycol, propylene glycol, butane diol and pentane diol. Typically useful dicarboxylic acids or anhydrides thereof include phthalic acid, phthalic anhydride, isophthalic acid, terephthalic acid, maleic acid, maleic anhydride and fumaric acid. Typical mono-carboxylic acids include benzoic acid, paratertiary butylbenzoic acid, phenol acetic acid and triethyl benzoic acid. One useful resin is the reaction product of an acrylic polymer and an alkyd resin.

If desired, the binder component of the coating composition may also include one or more oligomers in amounts of 1 to 50 weight percent, based on the weight of the binder and crosslinking agent. These oligomers typically have a weight average molecular weight (Mw) in the range of from 100 to 3,000, preferably, in the range from 500 to 1,500, a polydispersity in the range of from 1.01 to 1.70, preferably, in the range of from 1.05 to 1.50 and more preferably, in the range from 1.10 to 1.30, and having one or more isocyanate reactive functionalities. The oligomer preferably, includes in the range from 2 to 12, more preferably, in the range from 2 to 8 and most preferably, in the range from 2 to 6 isocyanate reactive functionalities. The suitable isocyanate reactive functionalities include a hydroxyl group, amine group or a combination thereof.

Typically useful acrylic oligomers comprise the same or similar constituents of the aforementioned acrylic polymers. Examples of such acrylic oligomers are hydroxy-ethyl methacrylate/hydroxy-butyl acrylate/isobornyl acrylate and hydroxy-ethyl methacrylate/hydroxy-propyl methacrylate/hydroxy-butyl acrylate/isobornyl acrylate;

Polyester oligomers also can be used and can be produced by first reacting a multifunctional alcohol, such as, pentaerythritol, hexanediol, trimethylol propane with alicyclic monomeric anhydrides, for example, hexahydrophthalic anhydride or methylhexahydrophthalic anhydride to produce an oligomeric acid. Oligomeric acids having at least one hydroxyl functionality are also suitable and are prepared by reacting the multifunctional alcohol with less than a stochiometric amount of the monomeric anhydride.

The oligomeric acid is then reacted with a monofunctional epoxy compound under pressure at a reaction temperature in the range of from 60° C. to 200° C. Typical reaction time is in the range of from 1 hour to 24 hours, preferably, 1 hour to 4 hours. The foregoing two-step process ensures that the hydroxyl functionalities are uniformly distributed on each oligomeric chain of the reactive oligomer to produce the reactive oligomers with the polydispersity in the range described earlier. Monofunctional epoxy oligomer suitable for use in the present invention include alkylene oxide of 2 to 12 carbon atoms, ethylene, propylene and butylene oxides are preferred, ethylene oxide is more preferred. Other epoxies, such as, Cardura® E-10 glycidyl ester, supplied by Resolution Performance Products, Houston, Tex. may be used in conjunction with the monofunctional epoxies, described above. The details of producing the oligomer are described in U.S. Pat. No. 6,221,494, which is incorporated herein by reference.

If desired, the coating composition may include a second acrylic resin, similar in composition to the above described acrylic polymers or a polyester or a combination thereof in amounts of 1 to 25 weight percent based on the weight of the binder and crosslinking agent. The acrylic resin and/or the polyester have at least one or more of the aforedescribed isocyanate reactive functionalities, a weight average molecular weight (Mw) varying in the range of from 2000 to 30,000, preferably, varying in the range of from 3000 to 15,000 and a Tg varying in the range of from $-20°$ C. to $100°$ C., preferably, varying in the range of from $0°$ C. to $90°$ C. and more preferably, varying in the range of from $20°$ C. to $80°$ C.

Polyesters suitable for use in the present invention may be any conventional polyester conventionally polymerized from polyacids, including cycloaliphatic polycarboxylic acids, and suitable polyols, which include polyhydric alcohols. Examples of suitable polyacids are cycloaliphatic polycarboxylic acids, such as, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form or a mixture thereof. Examples of other suitable polycarboxylic acids, which, if desired, can be used together with the cycloaliphatic polycarboxylic acids, are aromatic and aliphatic polycarboxylic acids, such as, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols that can be used to form the polyesters include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, polyethylene glycol and polypropylene glycol. If desired, monohydric alcohols, such as, butanol, octanol, lauryl alcohol, ethoxylated or propoxylated phenols may also be included along with polyhydric alcohols. The details of polyester suitable for use in the present invention are further provided in the U.S. Pat. No. 5,326,820, which is incorporated herein by reference. One example of commercially available polyester suitable for use is SCD-1040 polyester, which is supplied by Etna Product Inc., Chagrin Falls, Ohio.

The polyisocyanate solution used to form the novel coating composition of this invention comprises a solution of a polyisocyanate having reactive isocyanate groups, in particular, an aromatic polyisocyanate having tertiary isocyanate groups, such as TMXDI ($\alpha,\alpha,\alpha'\alpha'$-tetramethyl-m-xylylene diisocyanate), adducts of TMXDI and an alkanol alkane, such as, trimethylol propane (TMP) commercially available as Cythane® 3174 from Cytec Industries, West Paterson, N.J. and also (meth)acrylate polymers having isocyanate reactive groups.

(Meth)acrylic polymers containing reactive isocyanate groups that are useful are polymers of ethylenically unsaturated monomers and mixtures thereof including styrene, alkyl styrene; vinyl toluene; acrylonitrile; alkyl(meth)acrylates having 1 to 18 carbon atoms in the alkyl group as mentioned above, cycloalkyl(meth)acrylates having 3 to 18 carbon atoms in the cycloalkyl group, such as, cyclohexyl (meth)acrylate, trimethylcyclohexyl(meth)acrylate, isobutylcyclohexyl(meth)acrylate; isobornyl(meth)acrylate, aryl (meth)acrylates, such as, benzyl(meth)acrylate; or any combination thereof. (Meth)acrylates of methyl, butyl, n-butyl, and isobornyl are preferred. The isocyanate component is provided by ethylenically polymerizable isocyanate monomers, such as meta-isopropenyl-$\alpha,\alpha$-dimethyl benzyl isocyanate (TMI) commercially available from Cytec Industries.

The level of the isocyanate monomer may vary in the range of from 1 to 60% by weight, preferably, varying in the range of from 2 to 50% by weight, and most preferably varying the range of from 3 to 45% by weight. The (meth) acrylic polymer has a weight average molecular weight (Mw) varying in the range of from 3,000 to 60,000, preferably, varying in the range of from 3,000 to 30,000, more preferably, varying in the range of from 3,000 to 20,000 and having a Tg varying in the range of from $-20$ C to $100$ C, preferably, varying in the range of from $-10$ C to $70$ C, and more preferably, varying in the range of from $-10$ C to $50$ C.

The relative amount of crosslinking agent used in the coating composition is adjusted to provide a molar equivalent ratio of NCO/(OH) in the range of from 0.15 to 2.0, preferably in the range of from 0.25 to 1.50 and more preferably, in the range of from 0.30 to 1.40.

The polyisocyanate solution contains an organic solvent and up to 30 percent by weight, based on the weight of the polyisocyanate solution of the aromatic polyisocyanate having tertiary isocyanate groups or the (meth)acrylic polymer containing reactive isocyanate groups. Preferably, the polyisocyanate solution contains 1 to 25 percent by weight of and more preferably, 3 to 15 percent by weight of the isocyanate component.

The following are suitable solvents that can be used to form the above described polyisocyanate solution, the acrylic polymer and other polymers that may be used in the novel coating composition and can be used to reduce the coating composition to the desired viscosity required, for example, for spray application. These solvents include aliphatic and aromatic hydrocarbons, such as, petroleum naphtha, xylene; esters, such as, butyl acetate, t-butyl acetate, isobutyl acetate, hexyl acetate; glycol ether esters, such as, propylene glycol monomethyl ether acetate, ketones, such as, acetone, methyl ethyl ketone, methyl amyl ketone and the like. The amount of organic solvent added depends upon the desired solids level as well as the desired amount of VOC of the composition. If desired, the organic solvent may be added to both components of the coating composition.

The amount of solvent added to the coating composition may be adjusted to provide the composition with a VOC (volatile organic content) in the desired range.

Although under normal conditions, the coating composition of the current invention does not require a catalyst, the coating composition may include one or more catalysts to enhance crosslinking of the components during curing. If the coating composition includes a catalyst, it may be used in the range of from 0.005 percent to 2 percent, preferably, in the range of from 0.01 to 1 percent and more preferably, in the range of from 0.02 percent to 0.7 percent of the catalyst, the percentages being in weight percentages based on the total weight of the binder and crosslinking component solids. These catalysts are added to the binder component.

Some of the suitable catalysts for polyisocyanates can include one or more tin compounds, tertiary amines or a combination thereof, and one or more acid catalysts known to those skilled in the art. Suitable tin compounds include dibutyl tin dilaurate, dibutyl tin diacetate, stannous octoate, and dibutyl tin oxide. Dibutyl tin dilaurate is preferred. Suitable tertiary amines include triethylene diamine. One commercially available catalyst that can be used is Fascat® 4202, dibutyl tin dilaurate, sold by Elf-Atochem North America, Inc. Philadelphia, Pa.

The pot life of the coating composition containing the aforedescribed catalyst can be extended by adding in the range of from 0.1 weight percent to 2.0 weight percent, preferably, in the range of from 0.15 weight percent to 1.0 weight percent and more preferably, in the range of from 0.2 weight percent to 0.5 weight percent, based on the weight of the binder and crosslinking agent, of a pot life extending agent. One of the suitable pot life-extending agents is a carboxylic acid, such as, acetic acid, propionic acid, butyric acid, lauric acid. Acetic acid is preferred.

The coating composition of the present invention may also contain conventional additives, such as, stabilizers, and rheology control agents, flow agents, and toughening agents. Typically useful conventional formulation additives include leveling and flow control agents, for example, Resiflow®S (acrylic terpolymer) supplied by Estron Chemical, Calvert, City, Ky., BYK® 320 and 325 (polysiloxanes), BYK® 347 (polyether-modified siloxane) supplied by BYK Chemie USA, Inc. Wallingford Conn. and rheology control agents, such as, fumed silica or wax. Such additional additives will, of course, depend on the intended use of the coating composition. Any additives that would adversely affect the clarity of the cured coating will not be included when the composition is used as a clear coating. The foregoing additives may be added to either component or both, depending upon the intended use of the coating composition.

To improve weatherability of the coating, 0.1 to 5 weight percent, preferably 0.5 to 2.5 weight percent and more preferably 1 to 2 weight percent of ultraviolet light stabilizers, screeners, quenchers and antioxidants can be added to the composition, the percentages being based on the total weight of the binder and crosslinking components solids. Typical ultraviolet light screeners and stabilizers include the following:

Benzophenones, such as, hydroxy dodecycloxy benzophenone, 2,4-dihydroxy benzophenone, and hydroxy benzophenones containing sulfonic acid groups.

Benzoates, such as, dibenzoate of diphenylol propane and tertiary butyl benzoate of diphenylol propane.

Triazines, such as, 3,5-dialkyl-4-hydroxyphenyl derivatives of triazine and sulfur containing derivatives of dialkyl-4-hydroxy phenyl triazine, hydroxy phenyl-1,3,5-triazine.

Triazoles, such as, 2-phenyl-4-(2,2'-dihydroxy benzoyl)-triazole and substituted benzotriazoles, such as, hydroxyphenyltriazole.

Hindered amines, such as, bis(1,2,2,6,6 pentamethyl-4-piperidinyl sebacate) and di[4(2,2,6,6, tetramethyl piperidinyl)]sebacate; and any mixtures of any of the above.

Typically, tints are formed that contain the desired pigments that are required to formulate a given coating composition color. These tints contain the pigment or mixture of pigments and a dispersing agent and solvent. The dispersing agent may be a binder component or a polymeric pigment dispersant know to those skilled in the art that is compatible with the binder components. The resulting coating composition after all of the components are mixed together typically contains pigments in a pigment to binder weight ratio of 1/100 to 350/100.

If the coating composition is used as a base-coat or top-coat coating composition, inorganic and organic colored pigments, metallic flakes and powders, such as, aluminum flake and aluminum powders; special effects pigments, such as, coated mica flakes, coated aluminum flakes coated with colored pigments may be used usually in combination with one or more inorganic or organic colored pigments.

If the coating composition is used as a primer, conventional primer pigments are used in a pigment to binder weight ratio of 150/100 to 500/100. Typical of such pigments that are useful in primers are titanium dioxide, zinc phosphate, iron oxide, carbon black, amorphous silica, high surface area silica, barium sulfate, talc, chromate pigments for corrosion resistance, such as, calcium chromate, strontium chromate, zinc chromate, magnesium chromate, barium chromate and hollow glass spheres.

These pigments are formed into a dispersion by using conventional dispersing techniques, such as, ball milling, sand milling, attritor grinding, and the like. The resulting dispersion or mill base is added to the coating composition.

In use, the first component of the multiple component coating composition contains the binder component and one or more of the tints having pigments dispersed therein, if the composition is a colored composition and not a clear, and then the component containing the crosslinking agent is added and the components are mixed together just prior to use or about 5 to 30 minutes before use to form the coating composition. A layer of the composition is typically applied to a substrate by conventional techniques, such as, spraying, electrostatic spraying, roller coating, dipping or brushing. Generally, a layer having a thickness in the range of from 25 micrometers to 75 micrometers is applied over a metal substrate, such as an automotive body, which is often pre-coated with other coating layers, such as, an electrocoat and primer. Typically, the composition is dried at ambient temperatures or at elevated temperatures of about 50° C. to 100° C. for about 2 to 60 minutes For a base coat/clear coat finish, the pigmented base coat is applied and then a conventional clear coating composition is applied over the pigmented base coating by any of the aforementioned described techniques, usually by spraying or electrostatic spraying. Generally, the base coating layer is flashed for 1 minute to 2 hours under ambient or elevated temperatures before the application of the clear coating composition. Suitable clear coating composition can include two-pack isocyanate crosslinked compositions, such as, 72200S ChromaPremier® Productive Clear blended with an activator, such as, 12305S Chroma Premier® Activator, or 3480S Low VOC Clear Composition. All the foregoing clear coating compositions are supplied by E. I. du Pont de Nemours and Company, Wilmington, Del. The clear coat is dried at ambient temperatures but moderately higher temperatures of up to about 100° C. can be used. As soon as the clear finish is dust free and tack free the vehicle can be moved from the work area to allow for the refinishing of another vehicle.

The coating composition of the present invention is suitable for use as a clear or pigmented composition. The composition can be pigmented with conventional pigments, including metallic flakes and can be used as a monocoat or as a basecoat or as a primer.

The coating composition of the present invention is suitable for providing coatings on a variety of substrates, such as metal, wood and concrete substrates and resinous surfaces, such as, for example, RIM (reaction injection molded) auto bumpers and dashboards. The present composition is especially suitable for refinish applications typically used in making repairs and touch-ups to automotive and truck bodies and parts. Obviously, the coating composition is also well suited for use in other applications, such as, coating truck bodies, boats, airplanes, tractors, cranes and other metal bodies. The coating composition of the present invention is also suitable for use in industrial and maintenance coating applications.

Testing Procedures used in the Examples

Turbidity—This procedure measures the turbidity of a solution. A solution was placed into a 30 ml glass vial (from VWR Scientific catalog #66011-165). The solution was held for 1, 2, 3, 4 weeks at 120° F. (49° C.) and for 3 months at room temperature. The turbidity of the solution was measured after each of these periods of time and was measured using a Hach Ratio Turbidity meter.

% Retained Isocyanate—The percent retained Isocyanate was determined using Infra Red spectroscopy. The initial and aged solutions of the isocyanate mixtures were evaluated by Infra Red. The peaks @ 2256 cm-1 (the Isocyanate peak) and @ 1689 cm-1 (the carbonyl group of the isocyanurate ring) were measured. The peak @ 1689 cm-1 was used to normalize the spectra, the peak at 2256 cm-1 was used to determine the amount of isocyanate.

Tg (glass transition temperature)—of a polymer was determined according to ASTM D-3418 (1988).

Molecular weights—GPC Mw and GPC Mn and the polydispersity (Mw/Mn) of the acrylic polymer and other polymers were determined by GPC (Gel Permeation Chromatography) using polystyrene standards and tetrahydrofuran as the solvent.

Chip Resistance Test—The test utilized a gravelometer and follows the procedure described in ASTM-D-3170-87 using a 55° panel angle with panels and stones kept in the freezer for a minimum of 2 hours prior to chipping (panels were tested with 0.47 liter (1 pint)/1.42 liters (3 pints) of stones after the coating was cured for 20 minute @ 60° C. (140° F.) bake then air drying for an additional 7 days.

Gloss Gloss was measured at 200 and 60° using a Byk-Gardener Glossmeter.

Distinctness of Image (DOI) DOI was measured using a Dorigon II (HunterLab, Reston, Va.).

Flexibility Test The test determines the flexibility of the coating over RIM (reaction injection molded) plastic. The coating is applied to a pre-primed RIM panel available from ACT Laboratories, Inc., Hillsdale, Mich. Flexibility is measured by bending the panel in a uniform motion over a 2⅝ inch (6.67 cm) diameter mandrel. The panel is examined for wrinkling, cracking and delamination of the applied coating. The coating is then rated using the following system: 5=no visible change, 4=trace, 3=slight, 2=moderate, 1=pronounced and 0=severe.

Impact Test This test determines the ability of the coating to resist damage from forward and reverse impact. A Gardner Impact Tester from Paul N. Gardner Co., Pompano Beach, Fla., is used. The coating is applied to a pre-primed metal panel available from ACT Laboratories, Inc., Hillsdale, Mich. The coated panel is then placed in the impact tester. Forward impact is determined when the impact is against the painted side of the panel and reverse impact is when the force is applied against the opposite side. The weighted steel rod is raised to the desired level to obtain the required in/lbs of force and released to impact against the panel. The panel is then examined for flaking, cracking and delamination of the painted surface. The impact area is then rated using the following system: 5=no visible change, 4=trace, 3=slight, 2=moderate, 1=pronounced and 0=severe.

The following examples illustrate the invention. All parts and percentages are on a weight basis unless otherwise indicated.

Abbreviation used:

"PBW" means parts by weight.

"TMI (meta vinyl isocyanate)" means meta-isopropenyl-α, α-dimethyl benzyl isocyanate.

"Cythane® 3174"—3:1 adduct of meta-α,α,α,α'-tetramethylxylene diisocyanate (TMXDI) and trimethylol propane (TMP).

"Tolonate® HDT"—isocyanurate trimer of hexamethylene diisocyanate from Rhodia, Inc. Cranbury, Conn.

EXAMPLES

Example 1

The following TMI acrylic polymers 1–5 were prepared as follows:

TMI Acrylic Polymer 1

To a two-liter reaction flask with heating mantle, stirrer, condenser with 50 ml moisture receiver, nitrogen blanket, monomer and initiator feed lines, enough solvent (butyl acetate) was added to completely fill the receiver. Then 226.72 g of solvent (butyl acetate) was added to the reaction flask and the flask heated to reflux. To this flask, a monomer mixture (styrene/methyl methacrylate/ n-butyl acrylate/TMI (meta vinyl isocyanate)—15.0/19.88/40.16/24.97) consisting of 114.13 g of styrene, from BP Amoco, 151.24 g of methyl methacrylate from Cyro Industries, 305.57 g of n-butyl acrylate from BASF Corporation and 189.98 g of TMI from Cytec Industries was added over a period of 210 minutes. Simultaneously with the monomer feed, a mixture consisting of 30.99 g of t-butyl peroxyacetate from Atofina Chemicals Inc. and 136.03 g of butyl acetate was added over a period of 240 minutes. Refluxing at polymerization temperature of 128° C. was maintained over the entire reaction time. After the monomer feed was complete, 22.67 g of butyl acetate was used to rinse the monomer flask and added to the reaction flask as was 22.67 g of butyl acetate used to rinse the initiator flask after the initiator feed and added to the reaction flask. After all feeds and rinses were added, the batch was held at reflux temperature for 150 minutes. The reaction flask was cooled to less than 80° C. and the contents poured out.

The resulting polymer solution had a polymer solids of 64.39% solids and the polymer had a GPC Mn of 5331 and a GPC Mw of 11260 and a theoretical Tg of 24.72.

TMI Acrylic Polymer 2

To a two-liter reaction flask with heating mantle, stirrer, condenser with 50 ml moisture receiver, nitrogen blanket, monomer and initiator feed lines, enough solvent (butyl acetate) was added to completely fill the receiver. Then, 226.72 g of solvent (butyl acetate) was added to the reaction flask and the flask heated to reflux. To this flask, a monomer mixture (styrene/methyl methacrylate/n-butyl acrylate/TMI (meta vinyl Isocyanate) 15.0/12.92/40.75/31.32) consisting of 114.13 g of styrene from BP Amoco, 98.34 g of methyl methacrylate from Cyro Industries, 310.11 g of n-butyl acrylate from BASF Corporation and 238.34 g of TMI from Cytec Industries was added over a period of 210 minutes. Simultaneously with the monomer feed, a mixture consisting of 30.99 g of t-butyl peroxyacetate, from Atofina Chemicals Inc. and 136.03 g of butyl acetate was added over a period of 270 minutes. Refluxing at a polymerization temperature of 128° C. was maintained over the entire reaction time. After the monomer feed completion, 22.67 g of butyl acetate was used to rinse the monomer flask and added to the reaction flask, as was 22.67 g of butyl acetate used to rinse the initiator flask and added to the reaction flask. After all feeds and rinses were added the batch was held for 150 minutes at reflux temperature. The reaction flask was then cooled to less than 80° C. and the contents poured out.

The polymer solution had a polymer solids of 64.54% with the polymer having a GPC Mn of 4887, a GPC Mw of 9974 and a theoretical Tg of 25.20.

TMI Acrylic Polymer 3

To a two-liter reaction flask with heating mantle, stirrer, condenser with 50 ml moisture receiver, nitrogen blanket, monomer and initiator feed lines, enough solvent (butyl acetate) was added to completely fill the receiver. Then 226.72 g of solvent (butyl acetate) was added to the reaction flask and the flask heated to reflux. To this flask, a monomer mixture (styrene/methyl methacrylate/n-butyl acrylate/TMI (meta vinyl Isocyanate) 15.0/13.92/46.12/24.97) consisting of 114.13 g of styrene from BP Amoco, 105.89 g of methyl methacrylate from Cyro Industries, 305.92 g of n-butyl acrylate from BASF Corporation and 189.98 g of TMI from Cytec Industries was added over a period of 210 minutes. Simultaneously with the monomer feed, a mixture consisting of 30.99 g of t-butyl peroxyacetate, from Atofina Chemicals Inc. and 136.03 g of butyl acetate was added over a period of 240 minutes. Refluxing at a polymerization temperature of 128° C. was maintained over the entire reaction time. After the monomer feed was complete, 22.67 g of butyl acetate was used to rinse the monomer flask and added to the reaction flask as was 22.67 g of butyl acetate used to rinse the initiator flask after the initiator feed and added to the reaction flask. After all feeds and rinses were added, the batch was held for 150 minutes at reflux temperature. The reaction flask was cooled to less than 80° C. and the contents poured out.

The resulting polymer solution had a polymer solids content of 63.05% and the polymer had a GPC Mn of 5507, a GPC Mw of 12095 and a theoretical Tg of 14.94.

TMI Acrylic Polymer 4

To a two-liter reaction flask with heating mantle, stirrer, condenser with 50 ml moisture receiver, nitrogen blanket, monomer and initiator feed lines, enough solvent (butyl acetate) was added to completely fill the receiver. Then 226.72 g of solvent (butyl acetate) was added to the reaction flask and the flask heated to reflux. To this flask, a monomer mixture (styrene/methyl methacrylate/n-butyl acrylate/TMI—15.0/3.97/42.14/38.89) consisting of 114.13 g of styrene from BP Amoco, 30.23 g of methyl methacrylate from Cyro Industries, 320.69 g of n-butyl acrylate from BASF Corporation and 295.87 g of TMI from Cytec Industries was added over a period of 210 minutes. Simultaneously with the monomer feed, a mixture consisting of 30.99 g of t-butyl peroxyacetate, from Atofina Chemicals Inc. and 136.03 g of butyl acetate was added over a period of 240 minutes. Refluxing at a polymerization temperature of 128° C. was maintained over the entire reaction time. After the monomer feed was complete, 22.67 g of butyl acetate was used to rinse the monomer flask and added to the reaction flask as was 22.67 g of butyl acetate used to rinse the initiator flask after the initiator feed and added to the reaction flask. After all feeds and rinses were added the batch was held for 150 minutes at reflux temperature. The reaction flask was cooled to less than 80° C. and the contents poured out.

The resulting polymer solution had a polymer solids content of 61.72% with the polymer having a GPC Mn of 4855, a GPC Mw of 9677, and a theoretical Tg of 24.63.

TMI Acrylic Polymer 5

To a two-liter reaction flask with heating mantle, stirrer, condenser with 50 ml moisture receiver, nitrogen blanket, monomer and initiator feed lines, enough solvent (butyl acetate) was added to completely fill the receiver. Then 173.82 g of solvent (butyl acetate) and 52.90 g of (ethyl acetate) was added to the reaction flask and the flask heated to reflux. To this flask, a monomer mixture (styrene/methyl methacrylate/n-butyl acrylate/TMI—15.00/19.88/40.15/24.97) consisting of 114.13 g of styrene from BP Amoco, 151.24 g of methyl methacrylate from Cyro Industries, 305.57 g of n-butyl acrylate from BASF Corporation and 189.98 g of TMI from Cytec Industries was added over a period of 210 minutes. Simultaneously with the monomer feed, a mixture consisting of 30.99 g of t-butyl peroxyacetate from Atofina Chemicals Inc. and 5.80 g of butyl acetate and 30.23 g of ethyl acetate were added over a period of 240 minutes. Refluxing at a polymerization temperature of 106° C. was maintained over the entire reaction time. After the monomer feed was complete 22.67 g of butyl acetate was used to rinse the monomer flask and added to the reaction flask as was 22.67 g of butyl acetate used to rinse the initiator flask after the initiator feed and added to the reaction flask. After all feeds and rinses were added to reaction flask, the batch was held for 150 minutes at reflux temperature. The reaction flask was cooled to less than 80° C. and the contents poured out.

The resulting polymer solution has a polymer solids content of 63.19% with the polymer having a GPC Mn of 9184, a GPC Mw of 21299 and a theoretical Tg of 24.72.

The following solvent blend was prepared by mixing together the following solvents:

| | PBW |
|---|---|
| Butyl acetate | 40 |
| Methyl amyl ketone | 20 |
| VM& P Naphtha (Rule 66) from Ashland Chemical Company | 20 |
| Aromatic 100 from ExxonMobile Chemical Company | 20 |

The following seven-isocyanate solutions were prepared using the above solvent blend forming 5.0% solution of isocyanate (all amounts in PBW):

| | Solution | | | | | | |
|---|---|---|---|---|---|---|---|
| | 1 | 2 | 3 | 4 | 5 | 6 | 7 |
| Solvent blend | 95.00 | 93.24 | 92.23 | 92.25 | 92.08 | 91.90 | 92.09 |
| Tolonate ® HDT | 5 | | | | | | |
| Cythane ® 3174 | | 6.67 | | | | | |

-continued

| | Solution | | | | | | |
|---|---|---|---|---|---|---|---|
| | 1 | 2 | 3 | 4 | 5 | 6 | 7 |
| TMI Acrylic Polymer 1 | | | 7.77 | | | | |
| TMI Acrylic Polymer 2 | | | | 7.75 | | | |
| TMI Acrylic Polymer 3 | | | | | 7.92 | | |
| TMI Acrylic Polymer 4 | | | | | | 8.10 | |
| TMI Acrylic Polymer 5 | | | | | | | 7.91 |

The following tests were conducted on the above solutions:

The Turbidity of each of the solutions was measured after exposure for 1, 2, 3, 4 weeks at 120° F. (49° C.) and for 3 months at room temperature (RT). Initial Turbidity Readings for each of the solutions were 0.4 to 0.5.

| | 1 wk@ 120° F. | 2 wks@ 120° F. | 3 wks@ 120° F. | 4 wks@ 120° F. | 3 mo@ RT |
|---|---|---|---|---|---|
| Solution 1 | Gel | — | — | — | — |
| Solution 2 | 0.44 | 0.41 | 0.30 | 0.26 | — |
| Solution 3 | 0.48 | — | 0.50 | 0.54 | 0.44 |
| Solution 4 | 0.50 | — | 0.49 | 0.49 | 0.68 |
| Solution 5 | 0.73 | 0.70 | 0.70 | 0.78 | — |
| Solution 6 | 0.78 | 0.87 | 0.89 | 0.82 | — |
| Solution 7 | 0.51 | 0.55 | 0.54 | 0.63 | — |

Each of the above solutions was measured for % Retained Isocyanate after 4 wks@ 120° F. (49 ° C.) and at 3 months @ room temperature.

| | 4 wks@ 120° F. | 3 mo@ RT |
|---|---|---|
| Solution 1 | Gel | Gel |
| Solution 2 | 98.00% | 96.61% |
| Solution 3 | 96.65% | 99.72% |
| Solution 4 | 97.28% | 98.25% |
| Solution 5 | 99.80% | — |
| Solution 6 | 96.05% | — |
| Solution 7 | 94.99% | — |

The above data shows that the isocyanates having tertiary isocyanate groups have excellent dilution stability, even when diluted down to 5% with solvent. These isocyanates solutions have excellent turbidity values and retained isocyanate after 4 weeks at elevated temperature storage and 3 months at room temperature storage when compared to the solutions of standard isocyanates based on the isocyanurate trimer of hexamethylene diisocyanate (Tolonate® HDT). As such, these isocyanates having tertiary isocyanate groups could be blended with the reducer package in a typical basecoat formulation and remain stable and useful for a long period of time. By contrast, the standard isocyanates could not be blended with the reducer package because they gel in only 1 week's time when exposed at 120° F. (49° C.).

Example 2

Basecoat composition of the invention and a comparative basecoat composition were prepared by forming a tinting composition and then blending this tinting composition with the other components of the basecoat composition.

A Red Metallic Composite Tinting A was produced by mixing together, on an air mixer, the components shown below supplied by E.I. du Pont de Nemours and Company, Wilmington, Del.:

| Component | Description | PBW |
|---|---|---|
| 864J | DuPont Master Tint ® Magenta Tinting | 7884.55 |
| 813J | DuPont Master Tint ® Medium Course Aluminum Tinting | 1010.06 |
| Total | | 8894.61 |

TMI Acrylic Polymer 6

To a two-liter reaction flask with heating mantle, stirrer, condenser with 50 ml moisture receiver, nitrogen blanket, monomer and initiator feed lines, enough solvent (butyl acetate) was added to completely fill the receiver. Then 173.80 g of solvent (butyl acetate) and 52.90 g of (ethyl acetate) was added to the reaction flask and the flask heated to reflux. To this flask, a monomer mixture (styrene/methyl methacrylate/n-butyl acrylate/TMI—15.00/14.12/40.95/29.93) consisting of 114.13 g of styrene from BP Amoco, 107.40 g of methyl methacrylate from Cyro Industries, 311.60 g of n-butyl acrylate from BASF Corporation and 227.80 g of TMI from Cytec Industries was added over a period of 210 minutes. Simultaneously with the monomer feed, a mixture consisting of 30.99 g of t-butyl peroxyacetate from Atofina Chemicals Inc. and 90.70 g of butyl acetate and 45.30 g of ethyl acetate were added over a period of 270 minutes. Refluxing at a polymerization temperature of 106° C. was maintained over the entire reaction time. After the monomer feed was complete, 22.67 g of butyl acetate was used to rinse the monomer flask and added to the reaction flask as was 22.67 g of butyl acetate used to rinse the initiator flask after the initiator feed and added to the reaction flask. After all feeds and rinses were added to reaction flask, the batch was held for 120 minutes at reflux temperature. The reaction flask was cooled to less than 80° C. and the contents poured out.

The resulting polymer solution had a polymer solids content of 63.60% with the polymer having a GPC Mn of 9341, a GPC Mw of 21083 and a theoretical Tg of 24.54.

Basecoat compositions of Comparative Example 2 and Example 2 were prepared by adding the components listed in the table below in order shown using an air mixer:

| Component | Comparative Ex. 2 | Example 2 |
|---|---|---|
| Part 1 | | |
| Red Metallic Composite Tinting A prepared above) | 518.42 | 518.42 |
| ChromaPremier ® 62320F Basecoat Binder | 453.3 | 453.3 |
| ChromaSystems ® 7175S Basemaker | 828.27 | 414.14 |

-continued

| Component | Comparative Ex. 2 | Example 2 |
|---|---|---|
| Part 2 | | |
| ChromaSystems ® 7175S Basemaker | — | 414.14 |
| TMI Acrylic Polymer 6 (prepared above) | — | 85.5 |
| Total | 1799.99 | 1885.5 |

Test Panel Preparation

DuPont Variprime® Self-Etching Primer was prepared by mixing together 600 grams of 615S Variprime® with 400 grams of 616S Converter, all supplied by DuPont Company, Wilmington, Del. The Self-Etching Primer was sprayed according to the instructions in the ChromaSystem™ Technical Manual supplied by E.I. du Pont de Nemours and Company (hereby incorporated by reference), Wilmington, Del. over cold rolled steel panels (sanded with Norton 80-D sandpaper supplied by Norton, Worcester, Mass., and wiped twice with DuPont 3900S First Klean® supplied by E.I. du Pont de Nemours and Company, Wilmington, Del.) resulting in a film thickness of about 25.4 to 28 microns (1.0 to 1.1 mils). The above-prepared basecoats (Comparative Ex. 2 and Ex. 2) were then applied per the ChromaPremier® Basecoat instructions in the ChromaSystem™ Technical Manual, resulting in film thicknesses of about 30 to 36 micrometers (1.2 to 1.4 mils). After flashing, 72200S ChromaPremier® Productive Clear (528 grams 72200S ChromaPremier® Productive Clear blended with 187 grams 12305S ChromaPremier® Activator and 185 grams 12375S ChromaPremier® Medium Reducer, all supplied by E.I. du Pont de Nemours and Company, Wilmington, Del.) was applied per the instructions in the ChromaSystem™ Technical Manual, resulting in a film thickness of about 56 microns (2.2 mils). After flashing, the panels were baked for 20 minutes at 140° F. (60° C.). The panels were then exposed for one week at approximately 25° C. @ 50% relative humidity prior to testing.

Each of the panels was tested for Gloss, DOI, Chip Resistance and Adhesion. One set of panels tested for gloss was only coated with the basecoat.

Table 1 below, shows Gloss, at 200 and 60° and DOI (distinctness of image using a Dorigon II meter values:

TABLE 1

| Basecoat | 20° Gloss BC/CC | 60° Gloss BC only | DOI BC/CC |
|---|---|---|---|
| Comparative. Ex. 2 | 86.8 | 45.3 | 89 |
| Ex. 2 | 86.6 | 51.8 | 87.5 |

BC- basecoat BC/CC basecoat/clear coat

This data shows that the addition of the TMI Acrylic Polymer 6 did not adversely affect appearance.

The basecoat/clear coat panels were subjected to the chip resistance test and the results are shown in Table 2 below:

TABLE 2

| | Chip Resistance | |
|---|---|---|
| Basecoat* | 1 Pint | 3 Pints |
| Comparative Ex. 2 | 5 | 4.5 |
| Example 2 | 7.5 | 7 |

*All basecoats were coated with the clear coat described above in panel preparation.

The data showed that the panels' chip performance particularly benefited from the addition of TMI Acrylic Polymer to the basecoat (Example 2).

Table 3 below shows the results of the X-hatch and grid hatch adhesion test (ASTM D3359) after 96 hours in the humidity cabinet (ASTM-D-2247-99) at 100% relative humidity. Readings were taken before exposure (initially), immediately after removal from the humidity cabinet (wet).

TABLE 3

| | X-Hatch Adhesion | | Grid Hatch Adhesion | |
|---|---|---|---|---|
| Basecoat* | Initial | Wet | Initial | Wet |
| Comp. Ex. 2 | 9.5 | 9.0 | 10 | 9.5 |
| Example 2 | 10 | 9.5 | 10 | 10 |

*All basecoats were further coated with the clear coat described above in panel preparation.

The data showed that the panels' moisture resistance benefited slightly from the addition of TMI Acrylic Polymer to the lacquer basecoat.

Example 3

TMI Acrylic Polymer 7

To a two-liter reaction flask with heating mantle, stirrer, condenser with 50 ml moisture receiver, nitrogen blanket, monomer and initiator feed lines, enough solvent (butyl acetate) was added to completely fill the receiver. Then 506.97 g of solvent (butyl acetate) and 154.30 g of (ethyl acetate) was added to the reaction flask and the flask heated to reflux. To this flask, a monomer mixture (styrene/methyl methacrylate/n-butyl acrylate/TMI—11.03/2.20/56.84/29.93) consisting of 244.71 g of styrene from BP Amoco, 48.76 g of methyl methacrylate from Cyro Industries, 1261.57 g of n-butyl acrylate from BASF Corporation and 664.31 g of TMI from Cytec Industries was added over a period of 210 minutes. Simultaneously with the monomer feed, a mixture consisting of 90.37 g of t-butyl peroxyacetate from Atofina Chemicals Inc. and 264.51 g of butyl acetate and 132.25 g of ethyl acetate were added over a period of 270 minutes. Refluxing at a polymerization temperature of 106° C. was maintained over the entire reaction time. After the monomer feed was complete 66.13 g of ethyl acetate was used to rinse the monomer flask and added to the reaction flask as was 66.13 g of butyl acetate used to rinse the initiator flask after the initiator feed and added to the reaction flask. After all feeds and rinses were added to reaction flask, the batch was held for 150 minutes at reflux temperature. The reaction flask was cooled to less than 80° C. and the contents poured out.

The resulting polymer solution had a polymer solids content of 62.82% with the polymer having a GPC Mn of 10194, a GPC Mw of 30116 and a theoretical Tg of −0.07.

A basecoat binder was formulated and four different basecoat compositions were formulated using five different crosslinking agents and each of the resulting coating tested for flexibility and impact.

An acrylic polymer solution was prepared by mixing the following constituents:

|  | Parts by Weight |
| --- | --- |
| Acrylic polymer made according to the teachings of U.S. Pat. No. 3,585,160. | 60 |
| Butyl acetate | 10 |
| Xylene | 30 |
| Total | 100 |

A CAB solution was prepared by mixing together the following constituents:

|  | Parts by Weight |
| --- | --- |
| Acetone | 739.1 |
| Cellulose acetate butyrate 381-20 (38% butyral 20 seconds viscosity) | 465.5 |
| Cellulose acetate butyrate 531-1 (53% butyral 1 seconds viscosity) | 156.5 |
| Cellulose acetate butyrate 381-2 (38% butyral 2 seconds viscosity) | 39.1 |
| Butyl acetate | 1108.7 |
| Total | 2499.9 |

A highly branched co-polyester polyol solution was prepared by mixing together the following constituents:

|  | Parts by Weight |
| --- | --- |
| Highly branched co-polyester polyol (prepared according to the teachings of U.S. patent application Ser. No. 10/370400, filed Feb. 19, 2003). | 65.0 |
| Xylene | 3.4 |
| Methyl amyl ketone | 31.6 |
| Total | 100.0 |

The following flow control agent solution was prepared by mixing together the following constituents:

|  | Parts by Weight |
| --- | --- |
| Xylene | 50 |
| Modaflow (acrylic resin modifier from Eastech Chemical Inc., Philadelphia, Pennsylvania) | 50 |
| Total | 100 |

The following wax dispersion was prepared by mixing together the following constituents:

|  | Parts by Weight |
| --- | --- |
| Xylene | 39.89 |
| Wax A-C ® 405 (T) from Honeywell Specialty Materials, Morristown, New Jersey | 5.99 |
| Butyl Acetate | 54.12 |
| Total | 100.00 |

A basecoat binder composition was prepared by mixing together the following constituents:

|  | Parts by Weight |
| --- | --- |
| Acrylic copolymer solution (described above) | 23.83 |
| Xylene | 31.12 |
| Acetone | 2.64 |
| Butyl Acetate | 3.96 |
| CAB Solution described above | 8.92 |
| Highly branched co-polyester polyol solution (described above) | 2.32 |
| Resimine ® HF 480 from UCB Chemicals Corp., Smyrna, Georgia | 0.41 |
| Maprenal ® MF 650 from UCB Chemicals Corp., Smyrna, Georgia | 0.49 |
| Flow Control Agent Solution (prepared above) | 0.28 |
| Wax dispersion (prepared above) | 26.03 |
| Total | 100.00 |

The following non-aqueous dispersion solution was prepared by mixing the following constituents:

|  | Parts by Weight |
| --- | --- |
| n-Butyl Alcohol | 4.00 |
| VM&P Naphtha | 16.32 |
| Toluene | 2.97 |
| Xylene | 0.52 |
| Isopropyl Alcohol | 1.03 |
| Core-Shell polymer made according the teachings of U.S. Pat. No. 5,859,136. | 39.68 |
| Methyl ethyl ketone | 35.48 |
| Total | 100.00 |

A basecoat reducer composition was prepared by mixing together the following constituents:

|  | Parts by Weight |
| --- | --- |
| Acetone | 8.72 |
| Butyl acetate | 13.00 |
| Butyl acetate | 34.00 |
| Methyl amyl ketone | 34.00 |
| Methyl isobutyl ketone | 15.50 |
| Aromatic controlled PET naphtha | 15.57 |
| Xylene | 12.00 |
| Aromatic 100 solvent | 0.85 |
| Resiflow S from ChemCentral, East Morrisville, Pennsylvania | 0.30 |
| Non-aqueous dispersion solution (prepared above) | 0.06 |
| Total | 100.00 |

The following Tolonate® HDT solution was prepared by mixing together the following constituents:

|  | Parts by Weight |
|---|---|
| Tolonate ® HDT | 65.0 |
| Butyl Acetate | 7.0 |
| Methyl Amyl Ketone | 21.0 |
| Exxate ® 600 Fluid from ExxonMobile Chemical, Baytown, Texas | 7.0 |
| Total | 100.00 |

The following four basecoat binder paint composition were prepared, each formed with a different isocyanate crosslinking agent, by mixing together the following constituents:

Basecoat #1

|  | Amount |
|---|---|
| Basecoat Binder (prepared above) | 200.0 ml |
| Basecoat Reducer Composition (prepared above) | 100.0 ml |
| Tolonate ® HDT solution (prepared above) | 12.8 g |

Basecoat #2

|  | Amount |
|---|---|
| Basecoat Binder (prepared above) | 200.0 ml |
| Basecoat Reducer Composition (prepared above) | 100.0 ml |
| Cythane ® 3174 (described above) | 12.8 g |

Basecoat #3

|  | Amount |
|---|---|
| Basecoat Binder (prepared above) | 200.0 ml |
| Basecoat Reducer Composition (prepared above) | 100.0 ml |
| TMI acrylic polymer solution (prepared according to the procedure as described above for TMI acrylic polymer solution 6 but polymer having a Mn = 8745 and Mw = 20462) | 12.8 g |

Basecoat #4

|  | Amount |
|---|---|
| Basecoat Binder (prepared above) | 200.0 ml |
| Basecoat Reducer Composition (prepared above) | 100.0 ml |
| TMI acrylic polymer solution 7 (described above) | 12.8 g |

Each of the basecoat binder paint compositions was spray applied to pre-primed RIM panels for flexibility testing and pre-primed metal panels for impact testing (as described above), to a dry film thickness of 1.0–1.2 mils (25.4–30.5 microns). The panels were flashed for 15 minutes, and then forced dried at 60° C. for 30 minutes. After 7 days exposure at ambient temperatures, the panels were then tested for flexibility and for impact. Each of the panels was subjected to a flexibility test described above, and the results are shown in the following Table 4 and to an impact test (forward and reverse) described above and the results are shown in the following Table 5.

TABLE 4

Flexibility Test Results

|  | Flexibility Rating |
|---|---|
| Basecoat #1 (Tolonate ® HDT isocyanate trimer) | 5 |
| Basecoat #2 Cythane ® 3174 (adduct of TMXDI and TMP) | 1 |
| Basecoat #3 (TMI acrylic polymer - invention) | 3 |
| Basecoat #4 (TMI acrylic polymer - invention) | 5 |

TABLE 5

Impact Test Results (in/lbs)

| Base-Coat | Forward Impact (in/lbs) | | | | Reverse Impact (in/lbs) | | | |
|---|---|---|---|---|---|---|---|---|
|  | 20 | 40 | 60 | 80 | 20 | 40 | 60 | 80 |
|  | Rating | | | | | | | |
| #1 | 5 | 5 | 4 | 3 | 4 | 3 | 3 | 3 |
| #2 | 4 | 1 | 1 | 1 | 3 | 3 | 3 | 3 |
| #3 | 4 | 3 | 1 | 1 | 3 | 3 | 3 | 3 |
| #4 | 4 | 4 | 4 | 3 | 4 | 4 | 3 | 3 |

The above flexibility and impact results show that Basecoats #3 and #4 made with the TMI acrylic polymers (invention) provided flexibility and impact resistance that is improved over Basecoat #2 (Cythane® 3174 crosslinked) and almost matching the performance of Basecoat #1 (Tolonate® HDT-HDI trimer crosslinked). Cythane® 3174, which was used to crosslink basecoat #2, has been shown in earlier examples to have excellent dilution stability. Thus Cythane® 3174 would be very useful for finishes that do not require a high level of flexibility.

Example 1 shows that isocyanates having tertiary isocyanate groups have excellent dilution stability when compared to solutions of standard isocyanates based the trimer of HDI (Tolonate® HDT). The TMI acrylic polymer of this invention provides the previously unattained performance of acceptable flexibility and impact performance combined with excellent dilution stability.

What is claimed is:

1. A multiple component coating composition comprising
    (a) a film forming binder component having isocyanate reactive groups comprising a (meth)acrylic polymer having pendent oxazoline ester groups and aminoester groups;
    (b) a stable polyisocyanate solution comprising organic liquid and up to 30% by weight, based on the weight of the polyisocyanate solution, of a polyisocyanate having reactive isocyanate groups selected from an aromatic polyisocyanate having tertiary isocyanate groups, a (meth)acrylic polymer containing reactive isocyanate groups, or a combination thereof; and
    (c) optionally, a tinting composition comprising a pigment, a dispersing agent and an organic liquid carrier;
    whereby components (a), (b) and (c) are blended together before application to a substrate and after application to the substrate the composition is cured to form a finish.

2. The coating composition of claim 1 wherein the (meth) acrylic polymer having pendent oxazoline ester groups and aminoester groups has hydroxyl groups.

3. The coating composition of claim 1 wherein the (meth) acrylic polymer having pendant oxazoline ester groups and aminoester groups comprises a polymer of polymerized alkyl(meth)acrylate, vinyl oxazoline ester and alkyl(meth) acrylate aminoester having 1–12 carbon atoms in the alkyl group.

4. The coating composition of claim 1 wherein the film forming binder component having isocyanate reactive groups comprises a branched copolyester.

5. The coating composition of claim 1 wherein the film forming binder component having isocyanate reactive groups comprises a branched copolyester and cellulose acetate butyrate.

6. The coating composition of claim 1 wherein the polyisocyanate having reactive isocyanate groups further comprises an adduct of a polyol and the aromatic polyisocyanate having tertiary isocyanate groups.

7. The coating composition of claim 6 wherein said polyol is trimethylol propane and said aromatic polyisocyanate having tertiary isocyanate groups is α,α,α,α'-tetramethyl-m-xylene diisocyanate.

8. The coating composition of claim 1 wherein the (meth) acrylic polymer containing reactive isocyanate groups is a polymer of polymerized alkyl(meth)acrylate and meta-isopropenyl-α,α-dimethyl benzyl isocyanate.

9. The coating composition of claim 1 wherein the (meth) acrylic polymer containing reactive isocyanate groups is a polymer of polymerized styrene, methyl methacrylate, butyl acrylate end meta-isopropenyl-α,α-dimethyl benzyl isocyanate.

10. A base coating composition comprising the composition of claim 1 including component (c).

11. A primer coating composition comprising the composition of claim 1 including pigments in a pigment to binder ratio of 150/100 to 500/100.

12. A clear coating composition comprising the composition of claim comprising the components (a) and (b).

13. The substrate coated with a primer layer of the composition of claim 11.

14. The substrate coated with a layer of the composition of claim 12.

15. A coating process comprising applying a layer of the coating composition of claim 1 to the substrate and curing the composition to form the finish thereon.

16. The substrate coated with a conventional clear coating composition applied over the primer layer of claim 11.

* * * * *